(12) United States Patent
Kim et al.

(10) Patent No.: US 8,734,287 B2
(45) Date of Patent: May 27, 2014

(54) POWER TRAIN FOR HYBRID VEHICLE

(71) Applicant: Hyundai Motor Company, Seoul (KR)

(72) Inventors: Baekyu Kim, Hwaseong-si (KR); Kyungha Kim, Yongin-si (KR); Jangmi Lee, Hwaseong-si (KR); Sungik Bae, Hwaseong-si (KR); Yeonho Kim, Suwon-si (KR); Wansoo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/921,624

(22) Filed: Jun. 19, 2013

(65) Prior Publication Data

US 2013/0296089 A1  Nov. 7, 2013

Related U.S. Application Data

(62) Division of application No. 12/953,183, filed on Nov. 23, 2010, now Pat. No. 8,491,438.

(30) Foreign Application Priority Data

Aug. 27, 2010  (KR) .................. 10-2010-0083393

(51) Int. Cl.
 *F16H 3/44* (2006.01)
(52) U.S. Cl.
 USPC .............................................. 475/282; 475/5
(58) Field of Classification Search
 USPC ................... 475/5, 269, 271, 282, 296, 330; 903/910
 See application file for complete search history.

(56) References Cited

U.S. PATENT DOCUMENTS

| | | | |
|---|---|---|---|
| 7,479,080 B2 | 1/2009 | Usoro | |
| 8,491,438 B2 * | 7/2013 | Kim et al. | 475/282 |
| 2006/0046886 A1 | 3/2006 | Holmes et al. | |
| 2006/0111213 A1 | 5/2006 | Bucknor et al. | |
| 2009/0093330 A1 | 4/2009 | Kumazaki et al. | |
| 2010/0029428 A1 | 2/2010 | Abe et al. | |
| 2010/0048338 A1 | 2/2010 | Si | |
| 2010/0160108 A1 | 6/2010 | Si et al. | |
| 2010/0227723 A1 | 9/2010 | Seo et al. | |
| 2011/0111908 A1 * | 5/2011 | Kim et al. | 475/5 |
| 2011/0319211 A1 * | 12/2011 | Si | 475/5 |

FOREIGN PATENT DOCUMENTS

| | | | |
|---|---|---|---|
| JP | 2007-223487 A | 9/2007 | |
| JP | 2008-114811 A | 5/2008 | |
| JP | 2008-179348 A | 8/2008 | |
| JP | 2009-90798 A | 4/2009 | |
| KR | 10-2009-0013872 A | 2/2009 | |
| KR | 10-2009-0113652 A | 11/2009 | |
| KR | 10-2009-0129047 A | 12/2009 | |
| KR | 10-2010-0037204 A | 4/2010 | |
| KR | 10-2011-0050894 A | 5/2011 | |

* cited by examiner

*Primary Examiner* — Justin Holmes
(74) *Attorney, Agent, or Firm* — Morgan, Lewis & Bockius LLP

(57) ABSTRACT

An exemplary embodiment of the present invention provides a power train for a hybrid vehicle can achieve three or more fixed gear ratio modes where a vehicle is driven at a fixed gear ratio, such as shift stages of common transmission, only by the driving force of an engine without driving a motor generator, as well as an electric vehicle mode, which is the basic drive modes of a hybrid vehicle, and two or more power division modes including an input division mode and a composite mode, thereby driving the vehicle with high efficiency in accordance with traveling conditions of the vehicle and improving fuel efficiency.

2 Claims, 30 Drawing Sheets

FIG.2

| MODE | | CL1 | CL2 | BK1 | BK2 | GEAR RATIO |
|---|---|---|---|---|---|---|
| | | | | | | NUMBER OF RING GEAR TEETH : NUMBER OF SUN GEAR TEETH = 2:1 |
| POWER SPLIT MODE | EV1 | | | ON | | |
| | INPUT SPLIT | | | ON | | |
| | COMPOSITE SPLIT | ON | | | | |
| | OUTPUT SPLIT | | ON | | | |
| FIXED GEAR RATIO MODE | UD 1 | ON | ON | | | 1.67 |
| | UD 2 | | ON | | ON | 1.50 |
| | 1:1 | ON | ON | | | |
| | OD | ON | | ON | | 0.67 |

FIG.4

| MODE | | CL1 | CL2 | BK1 | BK2 | GEAR RATIO (NUMBER OF RING GEAR TEETH : NUMBER OF SUN GEAR TEETH = 2:1) |
|---|---|---|---|---|---|---|
| POWER SPLIT MODE | EV1 | | | ON | | |
| | INPUT SPLIT | | | | | |
| | COMPOSITE SPLIT | ON | | ON | | |
| | OUTPUT SPLIT | | ON | | | |
| FIXED GEAR RATIO MODE | UD 1 | | ON | ON | | 3.00 |
| | UD 2 | ON | ON | | ON | 1.17 |
| | 1:1 | ON | ON | | | |
| | OD | ON | | ON | | 0.67 |

FIG.6

| MODE | | | CL1 | CL2 | BK1 | BK2 | GEAR RATIO NUMBER OF RING GEAR TEETH: NUMBER OF SUN GEAR TEETH=2:1 |
|---|---|---|---|---|---|---|---|
| EV1 | | | | | ON | | |
| POWER SPLIT MODE | INPUT SPLIT | | | | ON | | |
| | COMPOSITE SPLIT | | ON | | | | |
| FIXED GEAR RATIO MODE | UD 1 | | ON | | | | |
| | UD 2 | | | ON | ON | | 2.33 |
| | 1:1 | | ON | ON | | | 1.50 |
| | OD | | ON | | ON | | 0.33 |

FIG.8

| MODE | | | CL1 | CL2 | BK1 | BK2 | GEAR RATIO (NUMBER OF RING GEAR TEETH : NUMBER OF SUN GEAR TEETH=2:1) |
|---|---|---|---|---|---|---|---|
| POWER SPLIT MODE | EV1 | | | | ON | | |
| | | INPUT SPLIT | ON | | ON | | |
| | | COMPOSITE SPLIT | | ON | | | |
| | | OUTPUT SPLIT | ON | ON | ON | | |
| FIXED GEAR RATIO MODE | UD 1 | | ON | ON | | | 3.00 |
| | UD 2 | | ON | ON | | ON | 1.33 |
| | 1:1 | | ON | | ON | | |
| | OD | | ON | | ON | | 0.33 |

FIG.10

| MODE | | CL1 | CL2 | BK1 | BK2 | GEAR RATIO |
|---|---|---|---|---|---|---|
| | | | | | | NUMBER OF RING GEAR TEETH: NUMBER OF SUN GEAR TEETH=2:1 |
| EV1 | | | | ON | | |
| POWER SPLIT MODE | INPUT SPLIT | ON | | ON | | |
| | COMPOSITE SPLIT | | ON | | | |
| | OUTPUT SPLIT | | ON | ON | | |
| FIXED GEAR RATIO MODE | UD | ON | ON | | | 1.50 |
| | 1:1 | ON | ON | | | |
| | OD | ON | | | ON | 0.67 |

FIG.12

| MODE | | CL1 | CL2 | BK1 | BK2 | GEAR RATIO |
|---|---|---|---|---|---|---|
| | | | | | | NUMBER OF RING GEAR TEETH: NUMBER OF SUN GEAR TEETH=2:1 |
| EV1 | | ON | | ON | | |
| EV2 | | | | ON | | |
| POWER SPLIT MODE | INPUT SPLIT | ON | | ON | | |
| | COMPOSITE SPLIT | | ON | | | |
| | OUTPUT SPLIT | | ON | ON | | |
| FIXED GEAR RATIO MODE | UD | ON | ON | | | 3.00 |
| | 1:1 | ON | ON | | | |
| | OD | ON | | | ON | 0.67 |

FIG.14

| MODE | | | CL1 | CL2 | BK1 | BK2 | GEAR RATIO |
|---|---|---|---|---|---|---|---|
| | | | | | | | NUMBER OF RING GEAR TEETH : NUMBER OF SUN GEAR TEETH=2:1 |
| POWER SPLIT MODE | EV1 | INPUT SPLIT | | | ON | | |
| | | COMPOSITE SPLIT | ON | | ON | | |
| | | OUTPUT SPLIT | | ON | | | |
| FIXED GEAR RATIO MODE | | UD | ON | ON | ON | | |
| | | 1:1 | ON | ON | | | 1.5 |
| | | OD | ON | | | ON | 0.33 |

FIG. 16

| MODE | | CL1 | CL2 | BK1 | BK2 | GEAR RATIO NUMBER OF RING GEAR TEETH: NUMBER OF SUN GEAR TEETH=2:1 |
|---|---|---|---|---|---|---|
| EV1 | | | | ON | | |
| EV2 | | ON | | ON | | |
| POWER SPLIT MODE | INPUT SPLIT | ON | | ON | | |
| | COMPOSITE SPLIT | | ON | | | |
| | OUTPUT SPLIT | | ON | ON | | |
| FIXED GEAR RATIO MODE | UD | ON | | ON | | 3.00 |
| | 1:1 | ON | ON | | | |
| | OD | ON | | | ON | 0.33 |

FIG.18

| MODE | | CL1 | CL2 | BK1 | BK2 | GEAR RATIO |
|---|---|---|---|---|---|---|
| | | | | | | NUMBER OF RING GEAR TEETH : NUMBER OF SUN GEAR TEETH = 2:1 |
| POWER SPLIT MODE | EV1 | | | ON | | |
| | INPUT SPLIT | | | ON | | |
| | COMPOSITE SPLIT | ON | | | | |
| FIXED GEAR RATIO MODE | UD 1 | ON | ON | ON | | 3.00 |
| | UD 2 | ON | ON | ON | | 2.00 |
| | 1:1 | ON | | | | |
| | OD | ON | | | ON | 0.50 |

FIG.20

| MODE | | CL1 | CL2 | BK1 | BK2 | GEAR RATIO NUMBER OF RING GEAR TEETH: NUMBER OF SUN GEAR TEETH=2:1 |
|---|---|---|---|---|---|---|
| POWER SPLIT MODE | EV1 | | | ON | | |
| | INPUT SPLIT | | | ON | | |
| | COMPOSITE SPLIT | ON | | | | |
| FIXED GEAR RATIO MODE | UD 1 | ON | ON | | | 2.00 |
| | UD 2 | | ON | ON | | 1.50 |
| | 1:1 | ON | ON | ON | | |
| | OD | ON | | ON | | 0.50 |

FIG.22

| MODE | | CL1 | CL2 | BK1 | BK2 | GEAR RATIO NUMBER OF RING GEAR TEETH: NUMBER OF SUN GEAR TEETH=2:1 |
|---|---|---|---|---|---|---|
| EV1 | | | | ON | | |
| EV2 | | ON | | ON | | |
| POWER SPLIT MODE | INPUT SPLIT | ON | | ON | | |
| | COMPOSITE SPLIT | | ON | | | |
| FIXED GEAR RATIO MODE | UD | ON | ON | | | |
| | 1:1 | ON | ON | | | 1.50 |
| | OD | ON | | | ON | 0.75 |

FIG.24

| MODE | | CL1 | CL2 | BK1 | BK2 | GEAR RATIO |
|---|---|---|---|---|---|---|
| | | | | | | NUMBER OF RING GEAR TEETH: NUMBER OF SUN GEAR TEETH=2:1 |
| EV1 | | | | ON | | |
| EV2 | | ON | | ON | | |
| POWER SPLIT MODE | INPUT SPLIT | ON | | ON | | |
| | COMPOSITE SPLIT | | ON | | | |
| FIXED GEAR RATIO MODE | UD 1 | | ON | ON | | 3.00 |
| | UD 2 | | ON | | ON | 2.00 |
| | 1:1 | ON | | | | |
| | OD | ON | | | ON | 0.86 |

FIG.26

| MODE | | CL1 | CL2 | BK1 | BK2 | GEAR RATIO |
|---|---|---|---|---|---|---|
| | | | | | | NUMBER OF RING GEAR TEETH : NUMBER OF SUN GEAR TEETH = 2:1 |
| EV1 | | ON | | | | |
| EV2 | | | | ON | | |
| POWER SPLIT MODE | INPUT SPLIT | ON | | | | |
| | COMPOSITE SPLIT | | ON | | | |
| FIXED GEAR RATIO MODE | UD | ON | | ON | | 1.50 |
| | 1:1 | ON | ON | | | |
| | OD 1 | | | ON | ON | 0.50 |
| | OD 2 | ON | | | ON | 0.43 |

FIG.28

| MODE | | CL1 | CL2 | BK1 | BK2 | GEAR RATIO NUMBER OF RING GEAR TEETH: NUMBER OF SUN GEAR TEETH=2:1 |
|---|---|---|---|---|---|---|
| EV1 | | | | ON | | |
| EV2 | | ON | | ON | | |
| POWER SPLIT MODE | INPUT SPLIT | ON | | ON | | |
| | COMPOSITE SPLIT | | ON | | | |
| FIXED GEAR RATIO MODE | UD | ON | | ON | | 3.00 |
| | 1:1 | ON | ON | | | |
| | OD | ON | | | ON | 0.60 |

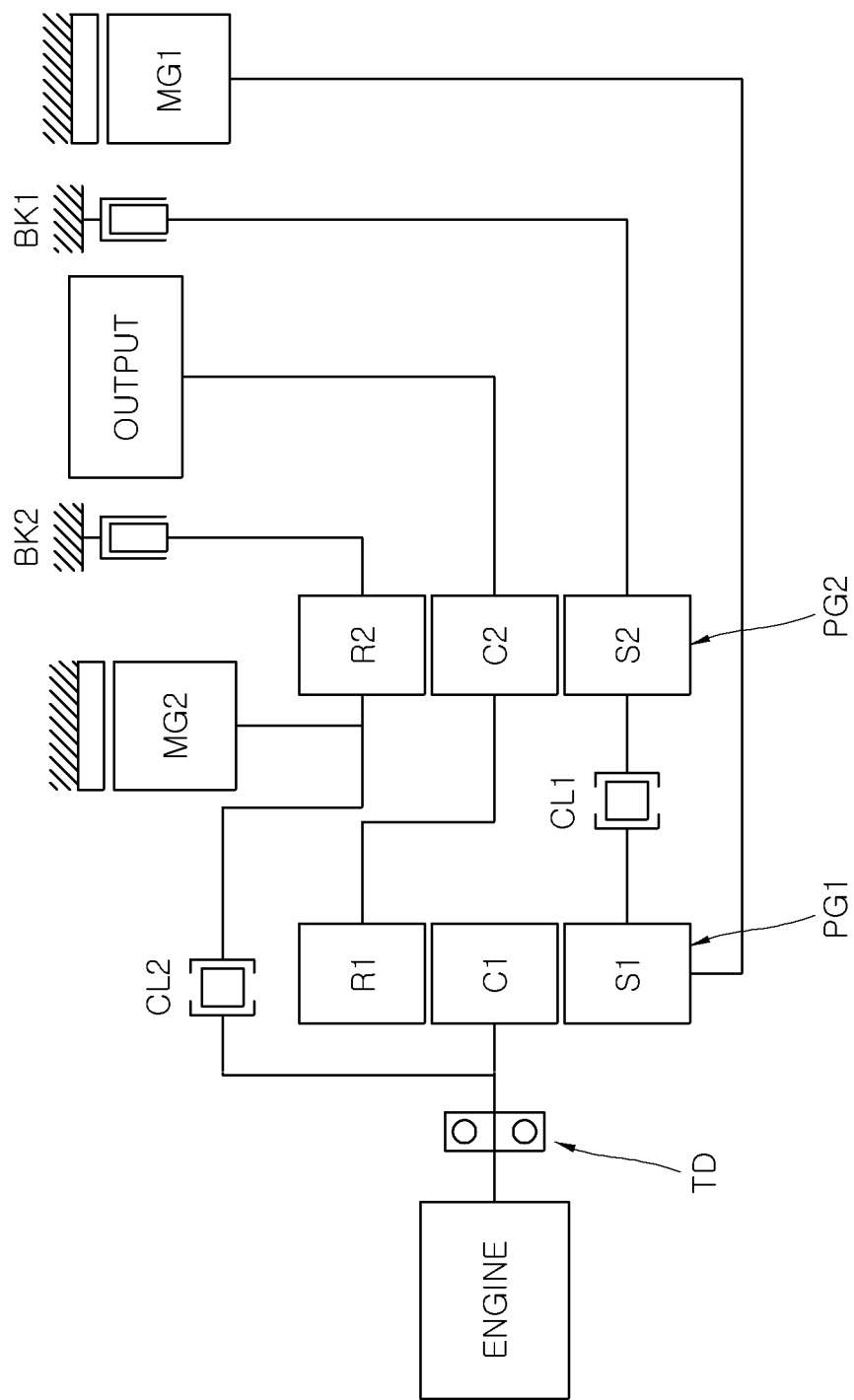

POWER TRAIN FOR HYBRID VEHICLE

CROSS-REFERENCE TO RELATED APPLICATIONS

The present application is a Divisional application of U.S. patent application Ser. No. 12/953,183, filed Nov. 23, 2010, which claims priority to Korean Patent Application Number 10-2010-0083393 filed Aug. 27, 2010, the entire contents of which applications are incorporated herein for all purposes by this reference.

BACKGROUND OF THE INVENTION

1. Field of the Invention

The present invention relates to a power train for a hybrid vehicle, and more particularly, to a technology of transmitting power from power sources to the driving wheels in a hybrid vehicle equipped with two or more different power sources, including an internal combustion engine.

2. Description of Related Art

Hybrid vehicles using an engine and a motor generator improve fuel efficiency of the vehicles by implementing an idle stop function and a regenerative braking function, on the basis of a technology of using power from the motor generator having relatively excellent low-velocity torque characteristics, as driving force at low velocity, and driving the vehicles using power from the engine having relatively excellent high-velocity torque characteristics at high velocity.

Further, hybrid vehicles do not produce exhaust gas from the engine when being driven only by a motor generator, which is recognized as an environmental-friendly vehicle technology having advantages of improving fuel efficiency and reducing exhaust gas.

A power train for a hybrid vehicle is provide with a variety of driving modes, such that, preferably, it can be efficiently driven while improving fuel efficiency and acceleration performance by shifting the driving modes in accordance with the traveling conditions of the vehicle, thereby improving the traveling performance of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a power train for a hybrid vehicle can achieve three or more fixed gear ratio modes where a vehicle is driven at a fixed gear ratio, such as shift stages of common transmission, only by the driving force of an engine without driving a motor generator, as well as an electric vehicle mode, which is the basic drive modes of a hybrid vehicle, and two or more power division modes including an input division mode and a composite mode, thereby driving the vehicle with high efficiency in accordance with traveling conditions of the vehicle and improving fuel efficiency.

An exemplary embodiment of the present invention provides a power train for a hybrid vehicle, which includes: two single planetary gear set having one rotary element, respectively, in which the rotary members are consistently connected, a first motor generator connected to a rotary element of a first planetary gear set, one of the single two planetary gear sets, a second motor generator connected to a rotary element of a second planetary gear set, the other of the two single planetary gear sets, an input element connected to any one of the rotary elements of the first planetary gear set, an output element connected to any one of the rotary elements not connected with the second motor generator, in the rotary elements of the second planetary gear set, and four torque transmission mechanisms connected to the rotary elements of the first planetary gear set and the second planetary gear set.

Another exemplary embodiment of the present invention provides a power train for a hybrid vehicle, which includes: a first planetary gear set that is a single planetary gear set, a second planetary gear set having one rotary element consistently connected with one rotary element of the first planetary gear set, a first motor generator connected to one rotary element of the first planetary gear set, a second motor generator connected with one rotary element of the second planetary gear set, an input element connected to any one of rotary elements of first planetary gear set, an output element connected to any one of rotary elements not connected with the second motor generator, in rotary elements of the second planetary gear set, a first clutch and a second clutch respectively connecting/disconnecting one rotary element of the first planetary gear set and one rotary element of the second planetary gear set, and a first brake and a second brake of which at least one is connected with any one of the other rotary elements not connected with the output element of the secondary planetary gear set.

Yet another exemplary embodiment of the present invention provides a power train for a hybrid vehicle, which includes: a first planetary gear set that is a single planetary gear set, a second planetary gear set having one rotary element consistently connected with one rotary element of the first planetary gear set, a first motor generator connected to one rotary element of the first planetary gear set, a second motor generator connected with one rotary element of the second planetary gear set, an input element connected to any one of rotary elements of first planetary gear set, an output element connected to any one of rotary elements not connected with the second motor generator, in rotary elements of the second planetary gear set, a first clutch connecting/disconnecting one rotary element of the first planetary gear set and one rotary element of the second planetary gear set, a second clutch connecting/disconnecting two rotary elements of the first planetary gear set, and a first brake and a second brake of which at least one is connected with any one of the other rotary elements not connected with the output element of the secondary planetary gear set.

According to the exemplary embodiments of the present invention, it is possible to achieve three or more fixed gear ratio modes where a vehicle is driven at a fixed gear ratio, such as shift stages of common transmission, only by the driving force of an engine without driving a motor generator, as well as an electric vehicle mode, which is the basic drive modes of a hybrid vehicle, and two or more power division modes including an input division mode and a composite mode, thereby driving the vehicle with high efficiency in accordance with traveling conditions of the vehicle and improving fuel efficiency.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is a table showing operation modes of the first exemplary embodiment shown in FIG. 1.

FIG. 4 is a table showing operation modes of the second exemplary embodiment shown in FIG. 3.

FIG. 6 is a table showing operation modes of the third exemplary embodiment shown in FIG. 5.

FIG. 8 is a table showing operation modes of the fourth exemplary embodiment shown in FIG. 7.

FIG. 10 is a table showing operation modes of the fifth exemplary embodiment shown in FIG. 9.

FIG. 12 is a table showing operation modes of the sixth exemplary embodiment shown in FIG. 11.

FIG. 14 is a table showing operation modes of the seventh exemplary embodiment shown in FIG. 13.

FIG. 16 is a table showing operation modes of the eighth exemplary embodiment shown in FIG. 15.

FIG. 18 is a table showing operation modes of the ninth exemplary embodiment shown in FIG. 17.

FIG. 20 is a table showing operation modes of the tenth exemplary embodiment shown in FIG. 19.

FIG. 22 is a table showing operation modes of the eleventh exemplary embodiment shown in FIG. 21.

FIG. 24 is a table showing operation modes of the twelfth exemplary embodiment shown in FIG. 23.

FIG. 26 is a table showing operation modes of the thirteenth exemplary embodiment shown in FIG. 25.

FIG. 28 is a table showing operation modes of the fourteenth exemplary embodiment shown in FIG. 27.

FIG. 30 is a diagram illustrating a different example of the first exemplary embodiment of a power train further including a torsion damper for a hybrid vehicle according to an exemplary embodiment of the present invention.

Figure 1:
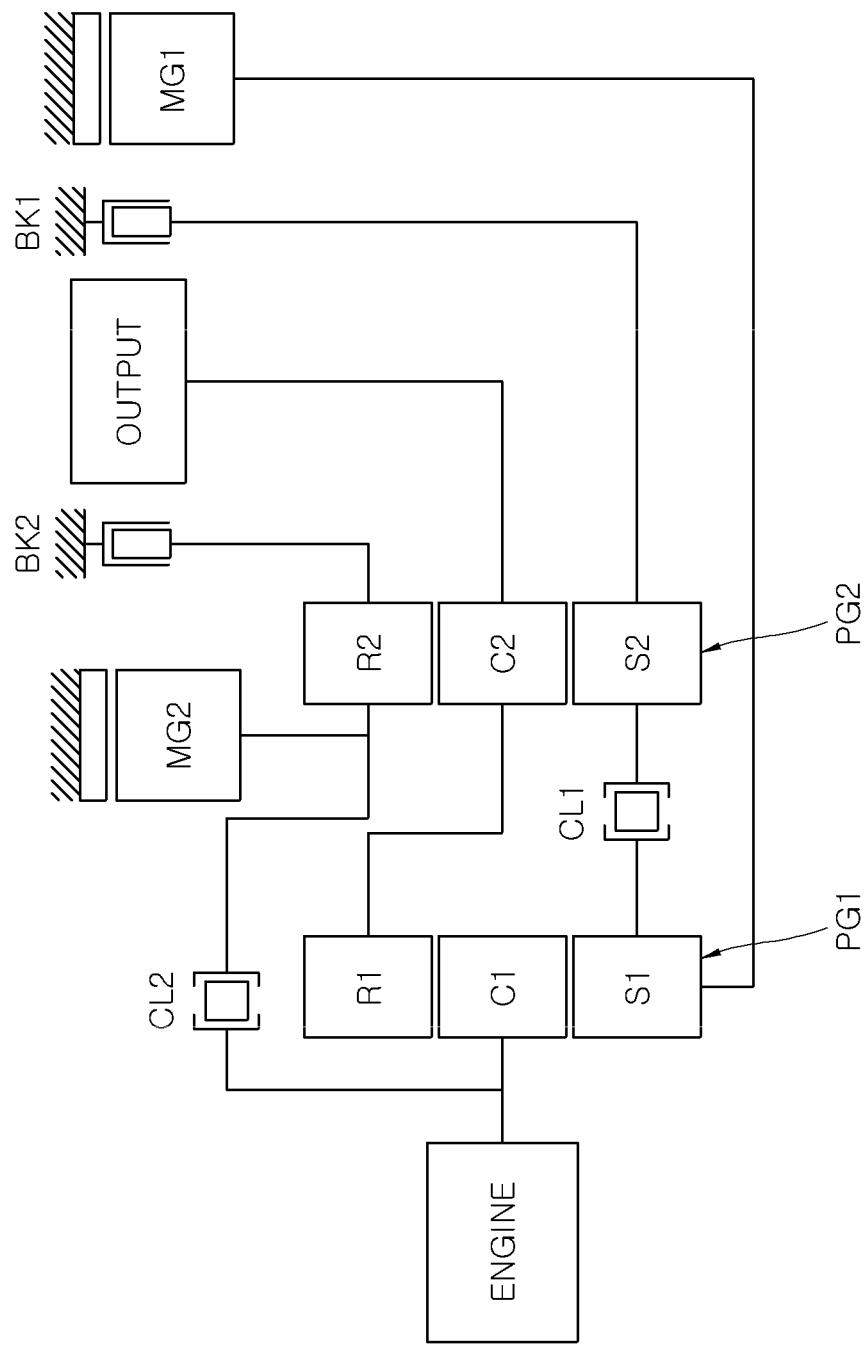
FIG. 1 is a diagram illustrating a first exemplary embodiment of a power train for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The power trains for a hybrid vehicle according to the first to fourteenth exemplary embodiment, which are shown in the odd-numbered figures in FIGS. 1 to 27, includes: two single planetary gear set having one rotary element, respectively, in which the rotary members are consistently connected, a first motor generator MG1 connected to a rotary element of a first planetary gear set PG1, one of the single two planetary gear sets, a second motor generator MG2 connected to a rotary element of a second planetary gear set PG2, the other of the two single planetary gear sets, an input element connected to any one of the rotary elements of first planetary gear set PG1, an output element OUTPUT connected to any one of the rotary elements not connected with second motor generator MG2, in the rotary elements of second planetary gear set PG2, and four torque transmission mechanisms connected to the rotary elements of first planetary gear set PG1 and second planetary gear set PG2.

First planetary gear set PG1 includes a first sun gear S1, a first carrier C1, and a first ring gear R1, as the rotary elements, second planetary gear set PG2 includes a second sun gear S2, a second carrier C2, and second ring gear R2, as the rotary elements, the input element is an engine ENGINE consistently connected to first carrier C1, output element OUTPUT is consistently connected to second carrier C2, two of the four torque transmission mechanisms are clutches connecting/disconnecting two rotary members, and the others are brakes connecting/disconnecting rotary members to fixed members to stop rotation.

In this configuration, at least one of the two brakes is connected to any one of the second sun gear S2 and the second ring gear R2 of the second planetary gear set, the brakes are a first brake BK1 and a second brake BK2, and the clutches are a first clutch CL1 and a second clutch CL2.

In all of the first to eighth exemplary embodiments shown in the odd-numbered figures in FIGS. 1 to 15, first clutch CL1 and second clutch CL2 connect/disconnect one rotary element of first planetary gear set PG1 and one rotary element of second planetary gear set PG2, respectively.

On the other hand, in all of the ninth to fourteenth exemplary embodiments shown in the odd-numbered figures in FIGS. 17 to 27, first clutch CL1 connects/disconnects one rotary element of first planetary gear set PG1 and one rotary element of second planetary gear set PG2 and second clutch CL2 connects/disconnects two rotary elements of first planetary gear set PG1.

In the first exemplary embodiment shown in FIG. 1, first ring gear R1 of first planetary gear set PG1 is consistently connected to second carrier C2 of second planetary gear set PG2, first motor generator MG1 is connected to first sun gear S1, second motor generator MG2 is connected to second ring gear R2, first clutch CL1 connects/disconnects first sun gear S1 and second sun gear S2, second clutch CL2 connects/disconnects first carrier C1 and second ring gear R2, first brake BK1 is connected to second sun gear S2, and second brake BK2 is connected to the second ring gear R2.

The operation modes of the first exemplary embodiment, as shown in the table of FIG. 2, include an EV1 mode that is an electric vehicle mode, input division, composite division, and output division modes that are power division modes, and UD1, UD2, 1:1, and 0D modes that are fixed gear ratio modes.

The EV1 mode is implemented by driving second motor generator MG2 such that torque of second ring gear R2 is reduced and outputted to second carrier C2, with second sun gear S2 fixed by first brake BK1.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 2, when the gear ratio of ring gear and sun gear is 2:1.

Figure 3:
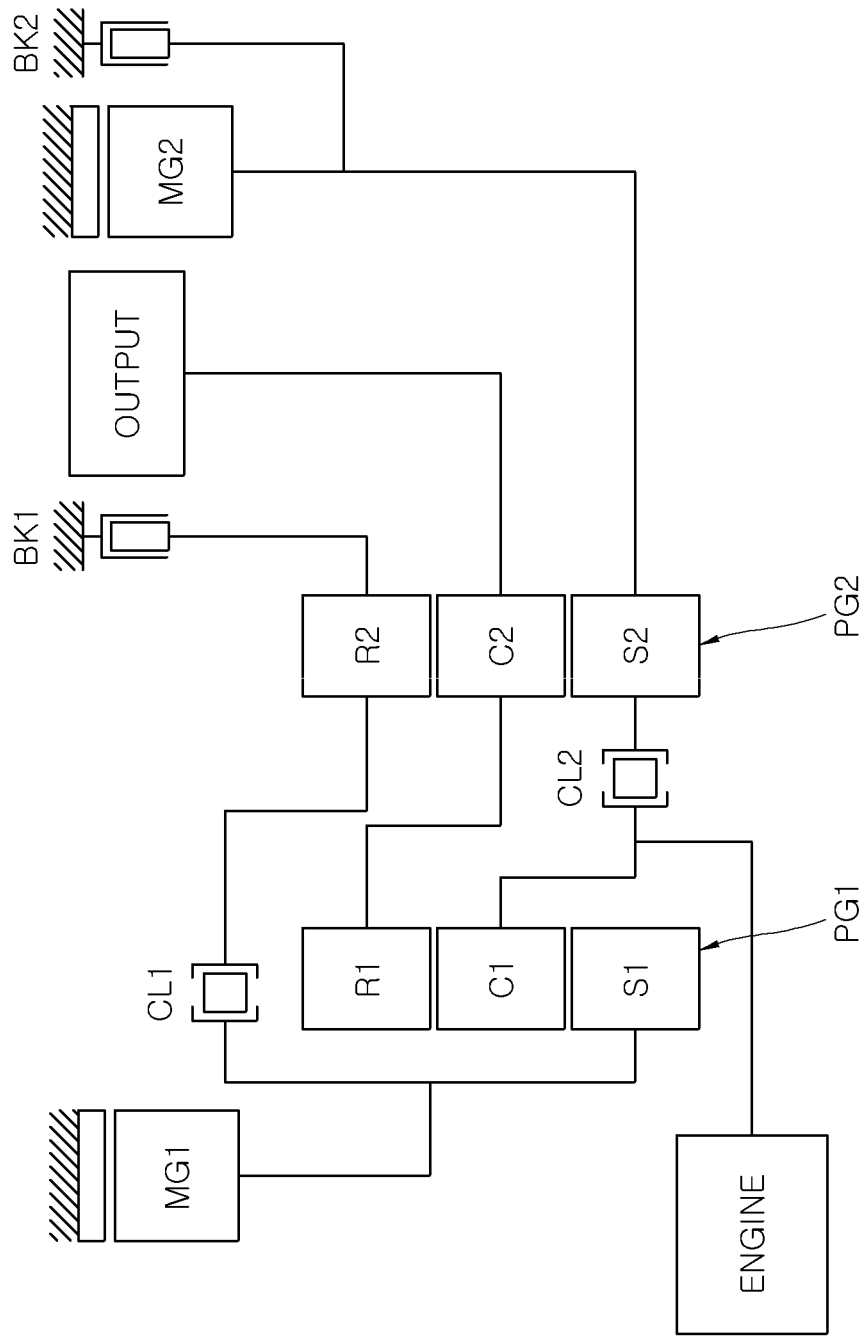
FIG. 3 is a view showing a second exemplary embodiment according to an exemplary embodiment of the present invention.

In the second exemplary embodiment shown in FIG. 3, first ring gear R1 of first planetary gear set PG1 is consistently connected to second carrier C2 of second planetary gear set PG2, first motor generator MG1 is connected to first sun gear S1, second motor generator MG2 is connected to second sun gear S2, first clutch CL1 connects/disconnects first sun gear S1 and second ring gear R2, second clutch CL2 connects/disconnects first carrier C1 and second sun gear S2, first brake BK1 is connected to second ring gear R2, and second brake BK2 is connected to the second sun gear S2.

The operation modes of the second exemplary embodiment, as shown in the table of FIG. 4, include an EV1 mode that is an electric vehicle mode, input division, composite division, and output division modes that are power division modes, and UD1, UD2, 1:1, and 0D modes that are fixed gear ratio modes.

The EV1 mode is implemented by driving second motor generator MG2 such that torque of second sun gear S2 is reduced and outputted to second carrier C2, with second ring gear R2 fixed by the first brake BK1.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 4, when the gear ratio of ring gear and sun gear is 2:1.

Figure 5:
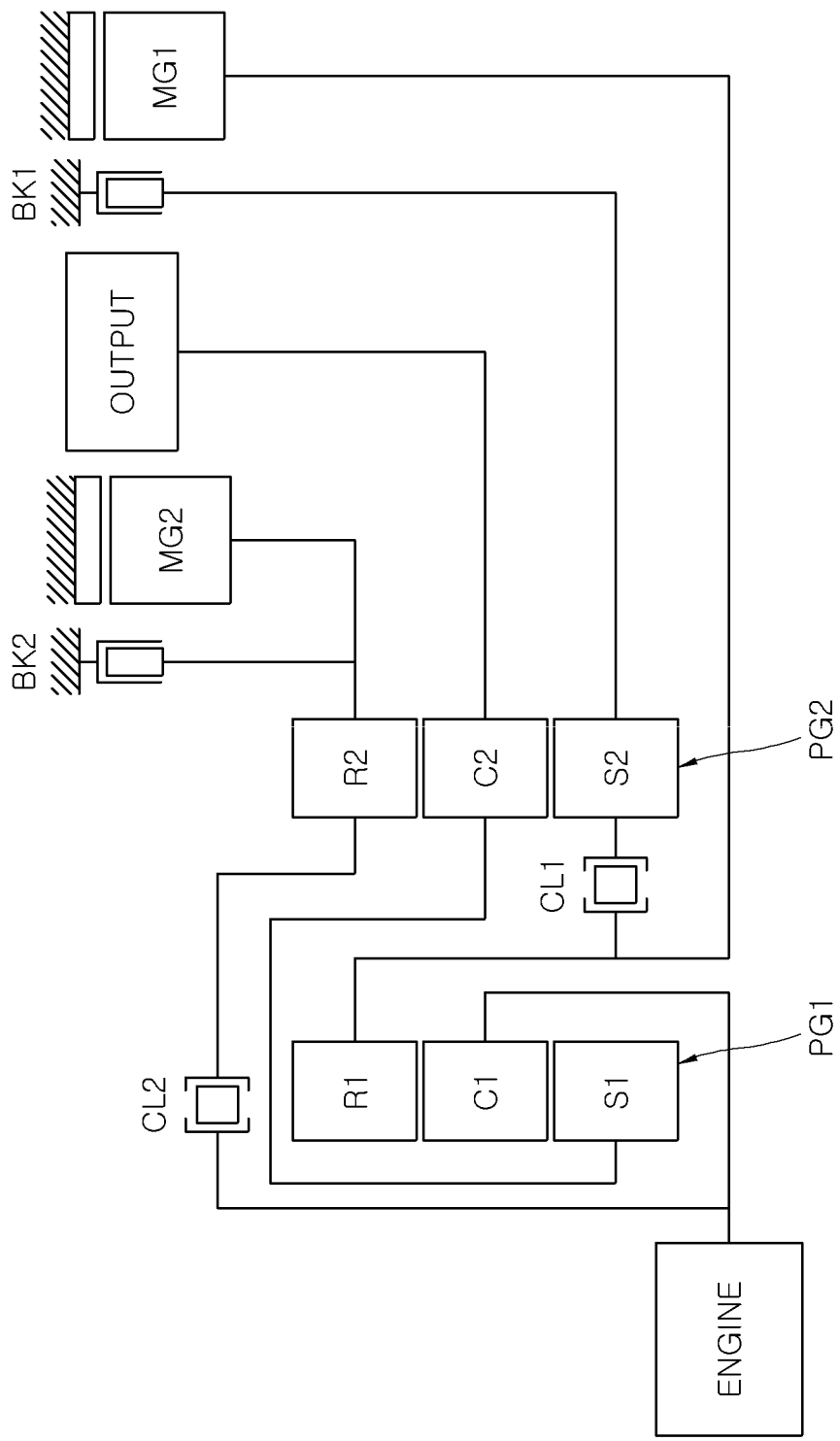
FIG. 5 is a diagram illustrating a third exemplary embodiment according to an exemplary embodiment of the present invention.

In the third exemplary embodiment shown in FIG. 5, first sun gear S1 of first planetary gear set PG1 is consistently connected to second carrier C2 of second planetary gear set PG2, first motor generator MG1 is connected to first ring gear R1, second motor generator MG2 is connected to second ring gear R2, first clutch CL1 connects/disconnects first ring gear R1 and second sun gear S2, second clutch CL2 connects/disconnects first carrier C1 and second ring gear R2, first brake BK1 is connected to second sun gear S2, and second brake BK2 is connected to the second ring gear R2.

The operation modes of the third exemplary embodiment, as shown in the table of FIG. 6, include an EV1 mode that is an electric vehicle mode, an input division mode and a composite division that are power division modes, and UD1, UD2, 1:1, and 0D modes that are fixed gear ratio modes.

The EV1 mode is implemented by driving second motor generator MG2 such that torque of second ring gear R2 is reduced and outputted to second carrier C2, with second sun gear S2 fixed by first brake BK1.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 6, when the gear ratio of ring gear and sun gear is 2:1.

Figure 7:
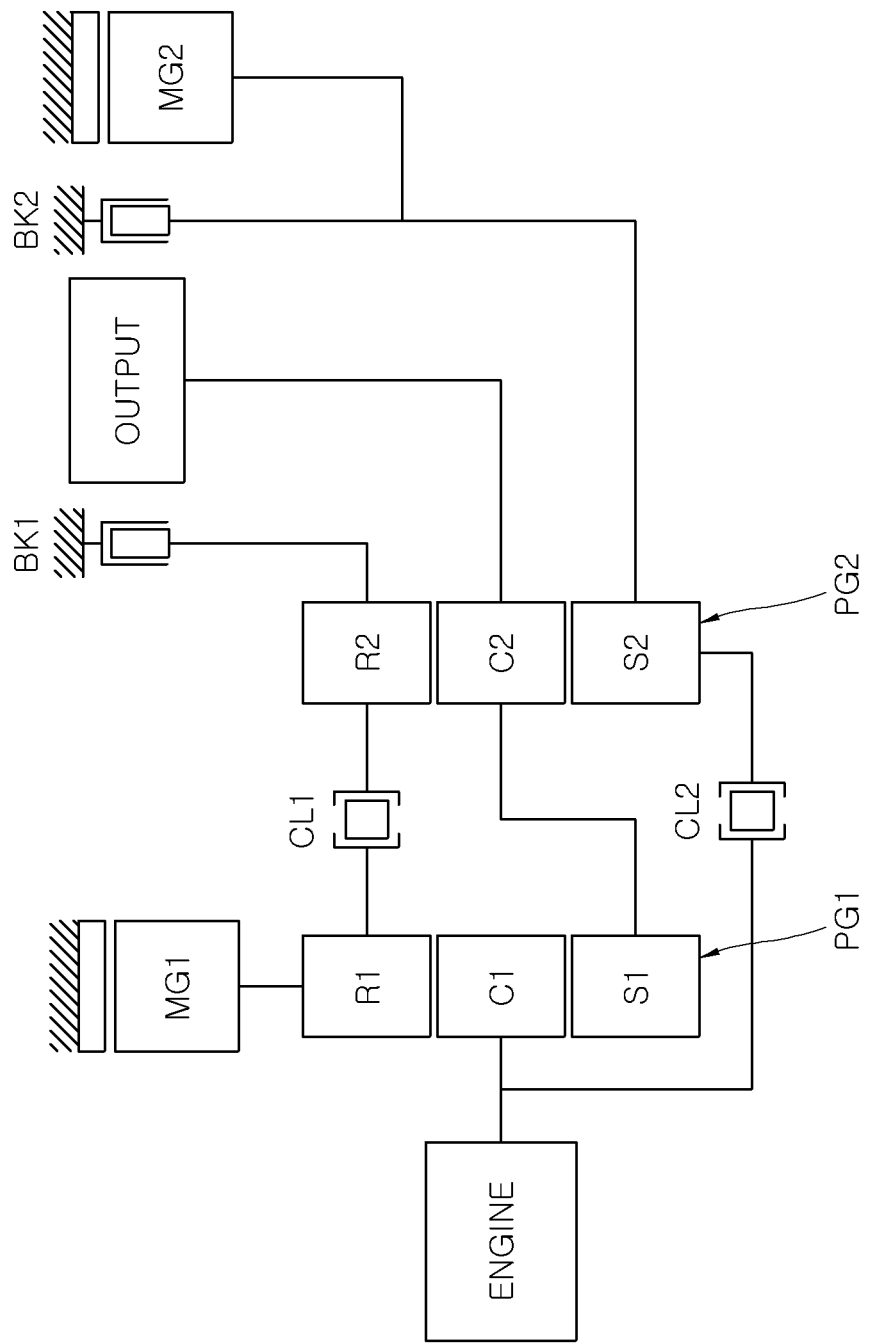
FIG. 7 is a view showing a fourth exemplary embodiment according to an exemplary embodiment of the present invention.

In the fourth exemplary embodiment shown in FIG. 7, first sun gear S1 of first planetary gear set PG1 is consistently connected to second carrier C2 of second planetary gear set PG2, first motor generator MG1 is connected to first ring gear R1, second motor generator MG2 is connected to second sun gear S2, first clutch CL1 connects/disconnects first ring gear R1 and second ring gear R2, second clutch CL2 connects/disconnects first carrier C1 and second sun gear S2, first brake BK1 is connected to second ring gear R2, and second brake BK2 is connected to the second sun gear S2.

The operation modes of the fourth exemplary embodiment, as shown in the table of FIG. 8, include an EV1 mode that is an electric vehicle mode, input division, composite division, and output division modes that are power division modes, and UD1, UD2, 1:1, and 0D modes that are fixed gear ratio modes.

The EV1 mode is implemented by driving second motor generator MG2 such that torque of second sun gear S2 is reduced and outputted to second carrier C2, with second ring gear R2 fixed by the first brake BK1.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 8, when the gear ratio of ring gear and sun gear is 2:1.

Figure 9:
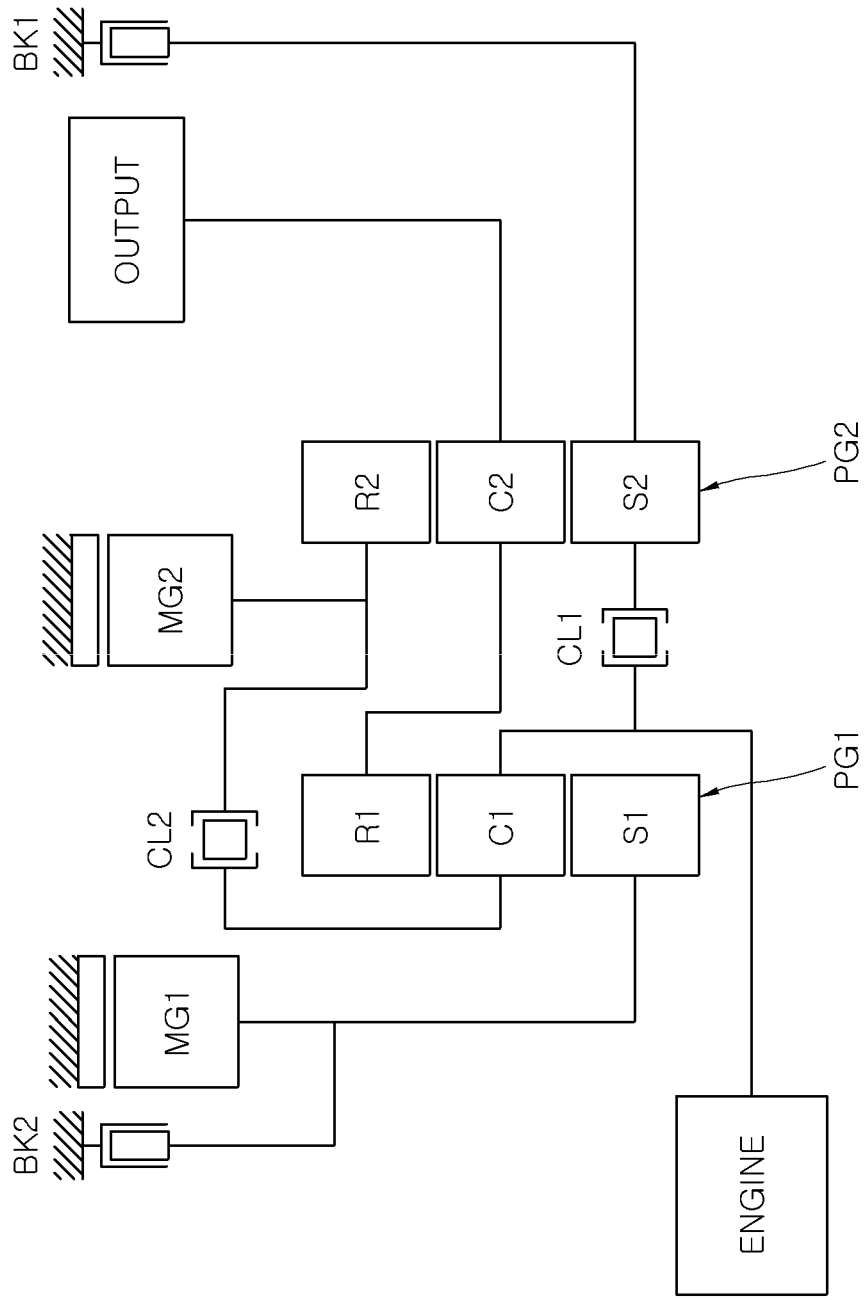
FIG. 9 is a diagram illustrating a fifth exemplary embodiment according to an exemplary embodiment of the present invention.

In the fifth exemplary embodiment shown in FIG. 9, first ring gear R1 of first planetary gear set PG1 is consistently connected to second carrier C2 of second planetary gear set PG2, first motor generator MG1 is connected to first sun gear S1, second motor generator MG2 is connected to second ring gear R2, first clutch CL1 connects/disconnects first clutch C1 and second sun gear S2, second clutch CL2 connects/disconnects first carrier C1 and second ring gear R2, first brake BK1 is connected to second sun gear S2, and second brake BK2 is connected to the first sun gear S1.

The operation modes of the fifth exemplary embodiment, as shown in the table of FIG. 10, include an EV1 mode that is an electric vehicle mode, input division, composite division, and output division modes that are power division modes, and UD, 1:1, and 0D modes that are fixed gear ratio modes.

The EV1 mode is implemented by driving second motor generator MG2 such that torque of second ring gear R2 is reduced and outputted to second carrier C2, with second sun gear S2 fixed by first brake BK1.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 10, when the gear ratio of ring gear and sun gear is 2:1.

Figure 11:
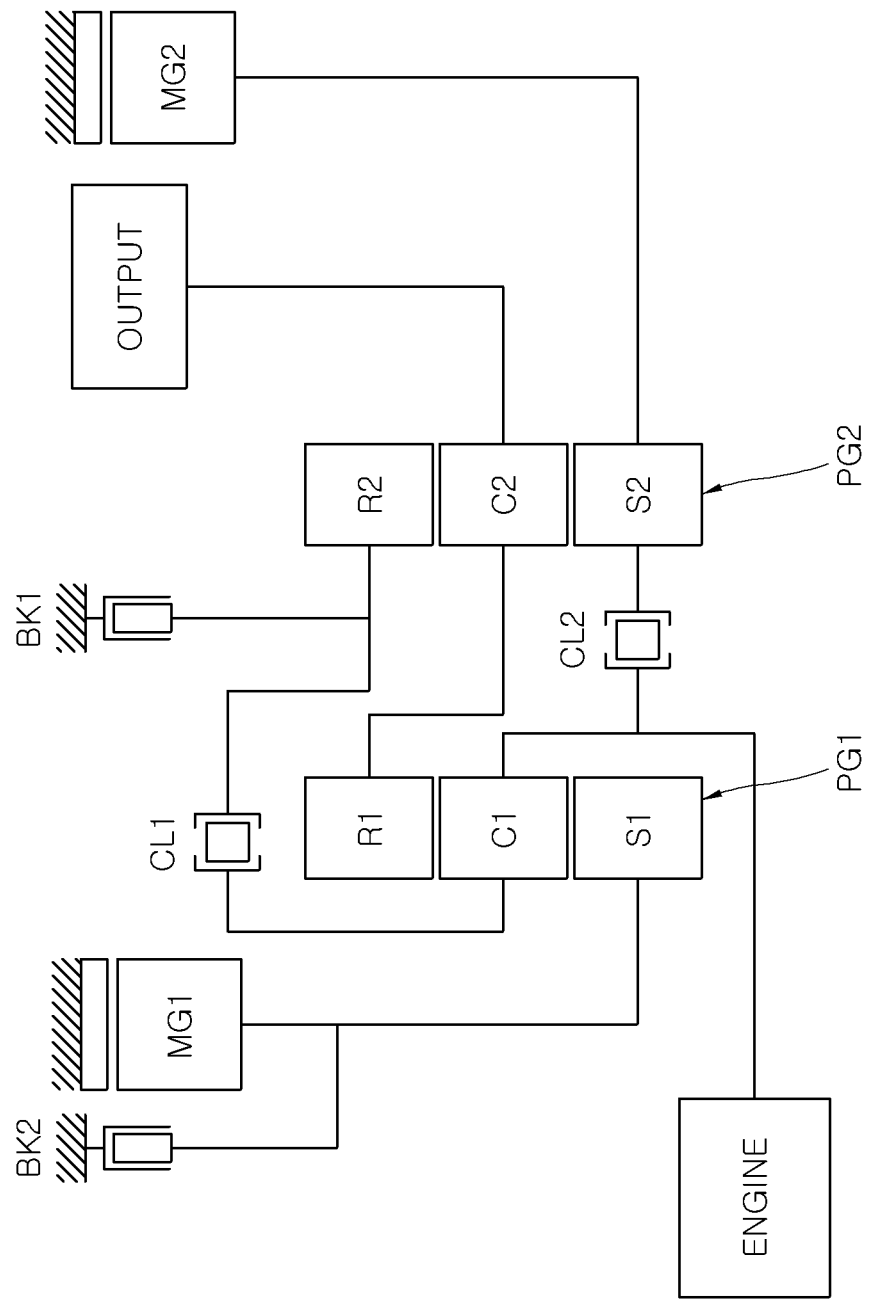
FIG. 11 is a view showing a sixth exemplary embodiment according to an exemplary embodiment of the present invention.

In the sixth exemplary embodiment shown in FIG. 11, first ring gear R1 of first planetary gear set PG1 is consistently connected to second carrier C2 of second planetary gear set PG2, first motor generator MG1 is connected to first sun gear S1, second motor generator MG2 is connected to second sun gear S2, first clutch CL1 connects/disconnects first clutch C1 and second ring gear R2, second clutch CL2 connects/disconnects first carrier C1 and second sun gear S2, first brake BK1 is connected to second ring gear R2, and second brake BK2 is connected to the first sun gear S1.

The operation modes of the sixth exemplary embodiment, as shown in the table of FIG. 12, include an EV1 mode and an EV2 mode that are electric vehicle modes, input division, composite division, and output division modes that are power division modes, and UD, 1:1, and 0D modes that are fixed gear ratio modes.

The EV1 mode is implemented by driving second motor generator MG2 such that torque of second sun gear S2 is reduced and outputted to second carrier C2, with second ring gear R2 fixed by first brake BK1 and the EV2 mode is implemented by engaging first clutch CL1 as well as first brake BK1 such that first carrier C1 is also fixed and the power from first motor generator MG1 can be added to the output, in addition to the power from second motor generator MG2.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 12, when the gear ratio of ring gear and sun gear is 2:1.

Figure 13:
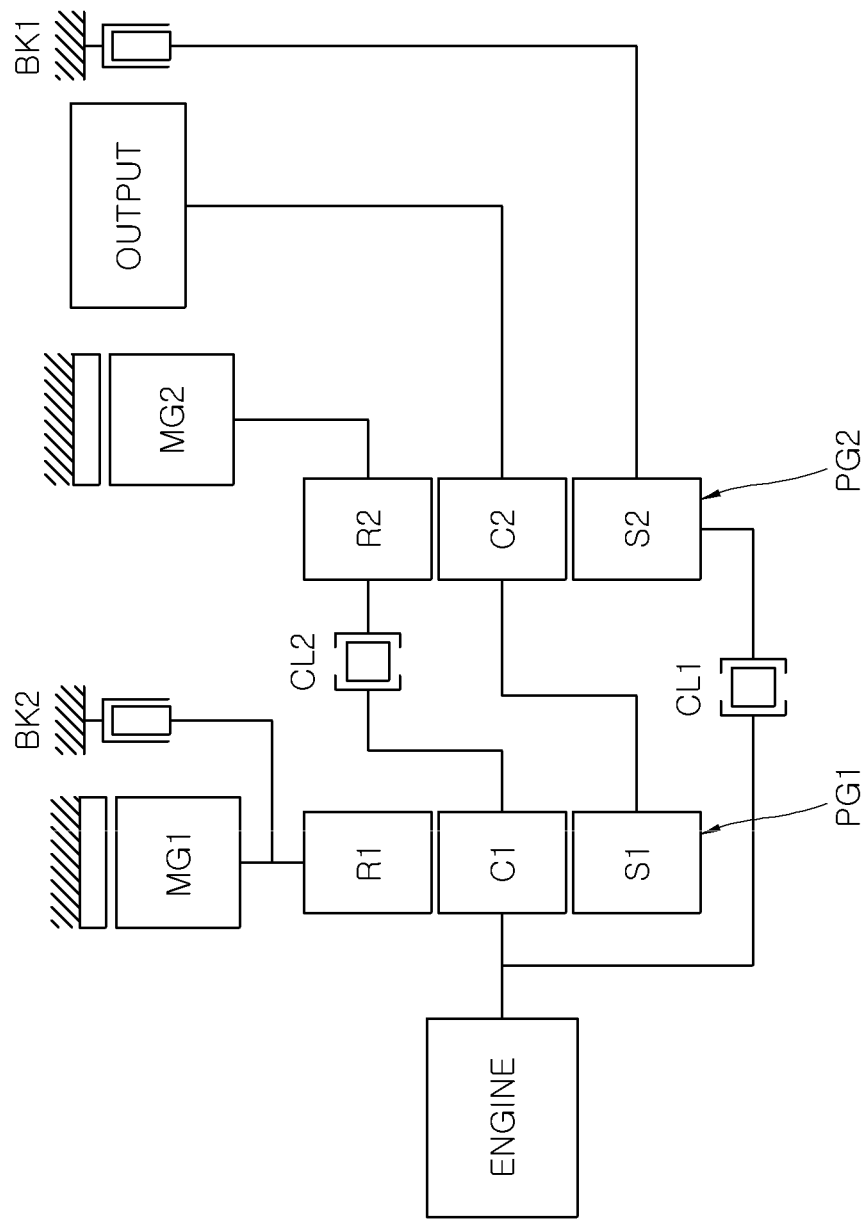
FIG. 13 is a view showing a seventh embodiment according to an exemplary embodiment of the present invention.

In the seventh exemplary embodiment shown in FIG. 13, first sun gear S1 of first planetary gear set PG1 is consistently connected to second carrier C2 of second planetary gear set PG2, first motor generator MG1 is connected to first ring gear R1, second motor generator MG2 is connected to second ring gear R2, first clutch CL1 connects/disconnects first clutch C1 and second sun gear S2, second clutch CL2 connects/disconnects first carrier C1 and second ring gear R2, first brake BK1 is connected to second sun gear S2, and second brake BK2 is connected to the first ring gear R1.

The operation modes of the seventh exemplary embodiment, as shown in the table of FIG. 14, include an EV1 mode that is an electric vehicle mode, input division, composite division, and output division modes that are power division modes, and UD, 1:1, and 0D modes that are fixed gear ratio modes.

The EV1 mode is implemented by driving second motor generator MG2 such that torque of second ring gear R2 is reduced and outputted across second carrier C2, with second sun gear S2 fixed by first brake BK1.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 14, when the gear ratio of ring gear and sun gear is 2:1.

Figure 15:
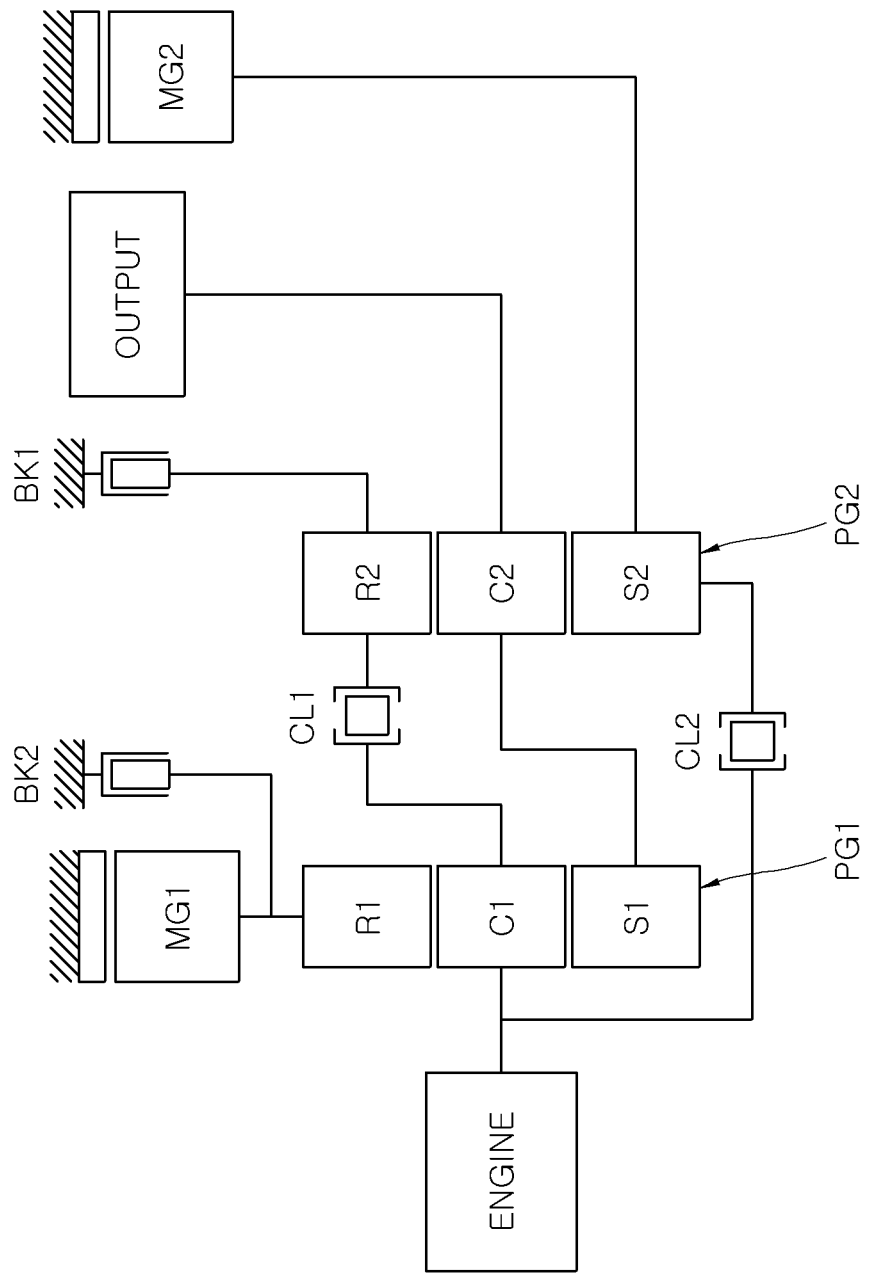
FIG. 15 is a diagram illustrating an eighth exemplary embodiment according to an exemplary embodiment of the present invention.

In the eighth exemplary embodiment shown in FIG. 15, first sun gear S1 of first planetary gear set PG1 is consistently connected to second carrier C2 of second planetary gear set PG2, first motor generator MG1 is connected to first ring gear R1, second motor generator MG2 is connected to second sun gear S2, first clutch CL1 connects/disconnects first clutch C1 and second ring gear R2, second clutch CL2 connects/disconnects first carrier C1 and second sun gear S2, first brake BK1 is connected to second ring gear R2, and second brake BK2 is connected to the first ring gear R1.

The operation modes of the eighth exemplary embodiment, as shown in the table of FIG. 16, include an EV1 mode and an EV2 mode that are electric vehicle modes, input division, composite division, and output division modes that are power division modes, and UD, 1:1, and 0D modes that are fixed gear ratio modes.

The EV1 mode is implemented by driving second motor generator MG2 such that torque of second sun gear S2 is reduced and outputted to second carrier C2, with second ring gear R2 fixed by first brake BK1 and the EV2 mode is implemented by additionally engaging first clutch CL1 such that first carrier C1 is also fixed by first brake BK1 and the power from first motor generator MG1 can be added to the output.

The input division mode is implemented by engaging only first brake BK1, the composite division mode is implemented by engaging only first clutch CL1, the output division mode is implemented by engaging only second clutch CL2, and the fixed gear ratio mode makes the output of engine ENGINE transmitted to output element OUTPUT at various fixed gear ratios, as shown in FIG. 16, when the gear ratio of ring gear and sun gear is 2:1.

Figure 17:
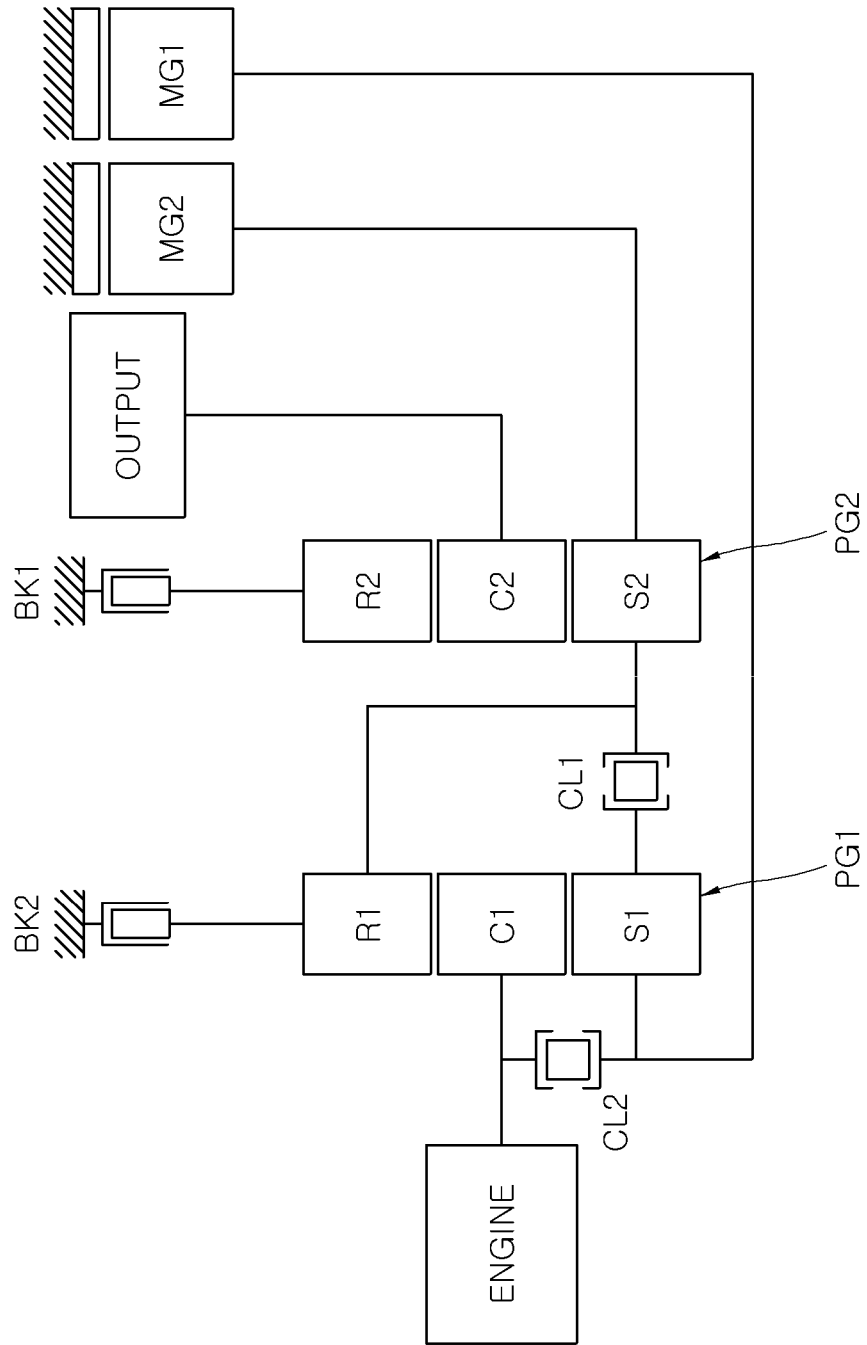
FIG. 17 is a view showing a ninth exemplary embodiment according to an exemplary embodiment of the present invention.

In the ninth exemplary embodiment shown in FIG. 17, first ring gear R1 of first planetary gear set PG1 is consistently connected to second sun gear S2 of second planetary gear set PG2, first motor generator MG1 is connected to first sun gear S1, second motor generator MG2 is connected to second sun gear S2, first clutch CL1 connects/disconnects first sun gear S1 and second sun gear S2, second clutch CL2 connects/disconnects first carrier C1 and first sun gear S1, first brake BK1 is connected to second ring gear R2, and second brake BK2 is connected to the first ring gear R1.

The operation modes of the ninth exemplary embodiment, as shown in the table of FIG. 18, include an EV1 mode that is an electric vehicle mode, an input division mode and a composite division that are power division modes, and UD1, UD2, 1:1, and 0D modes that are fixed gear ratio modes.

The EV1 mode is implemented by driving second motor generator MG2 such that torque of second sun gear S2 is reduced and outputted across second carrier C2, with second ring gear R2 fixed by the first brake BK1.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 18, when the gear ratio of ring gear and sun gear is 2:1.

Figure 19:
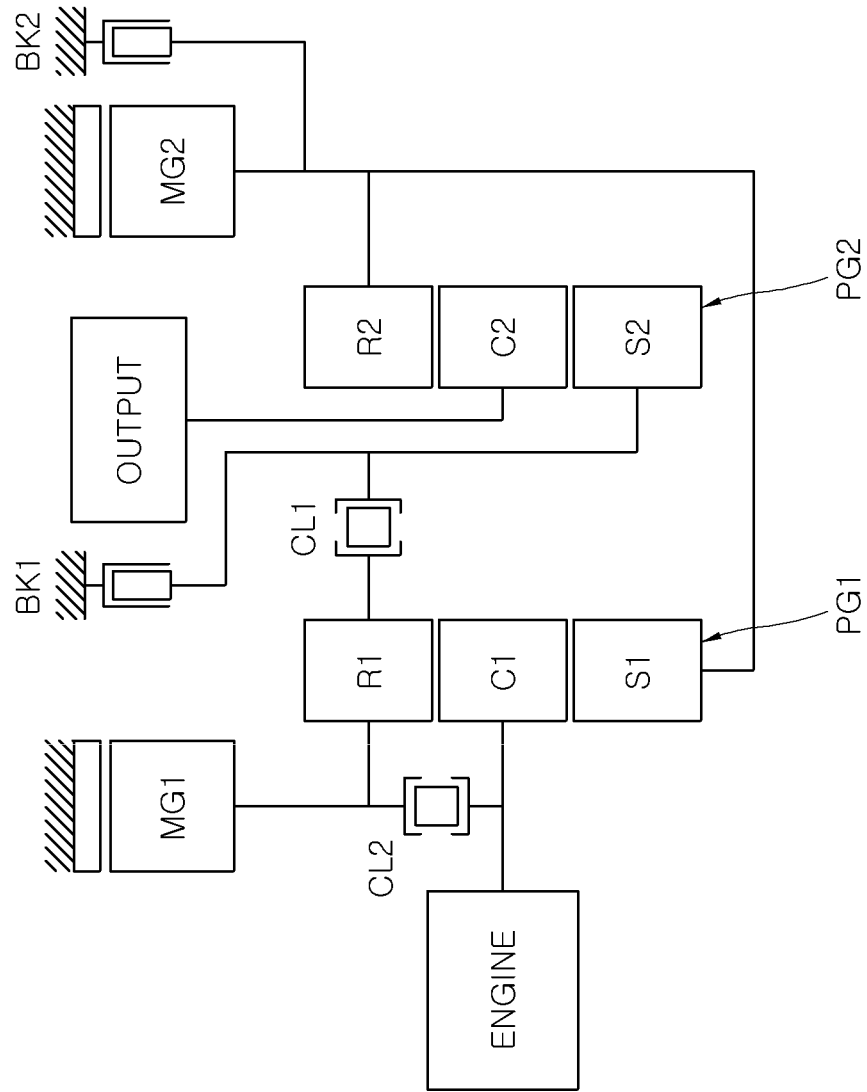
FIG. 19 is a diagram illustrating a tenth exemplary embodiment according to an exemplary embodiment of the present invention.

In the tenth exemplary embodiment shown in FIG. 19, first sun gear S1 of first planetary gear set PG1 is consistently connected to second ring gear R2 of second planetary gear set PG2, first motor generator MG1 is connected to first ring gear R1, second motor generator MG2 is connected to second ring gear R2, first clutch CL1 connects/disconnects first ring gear R1 and second sun gear S2, second clutch CL2 connects/disconnects first carrier C1 and first ring gear R1, first brake BK1 is connected to second sun gear S2, and second brake BK2 is connected to the second ring gear R2.

The operation modes of the tenth exemplary embodiment, as shown in the table of FIG. 20, include an EV1 mode that is an electric vehicle mode, an input division mode and a composite division mode that are power division modes, and UD1, UD2, 1:1, and 0D modes that are fixed gear ratio modes.

The EV1 mode is implemented by driving second motor generator MG2 such that torque of second ring gear R2 is reduced and outputted across second carrier C2, with second sun gear S2 fixed by first brake BK1.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 20, when the gear ratio of ring gear and sun gear is 2:1.

Figure 21:
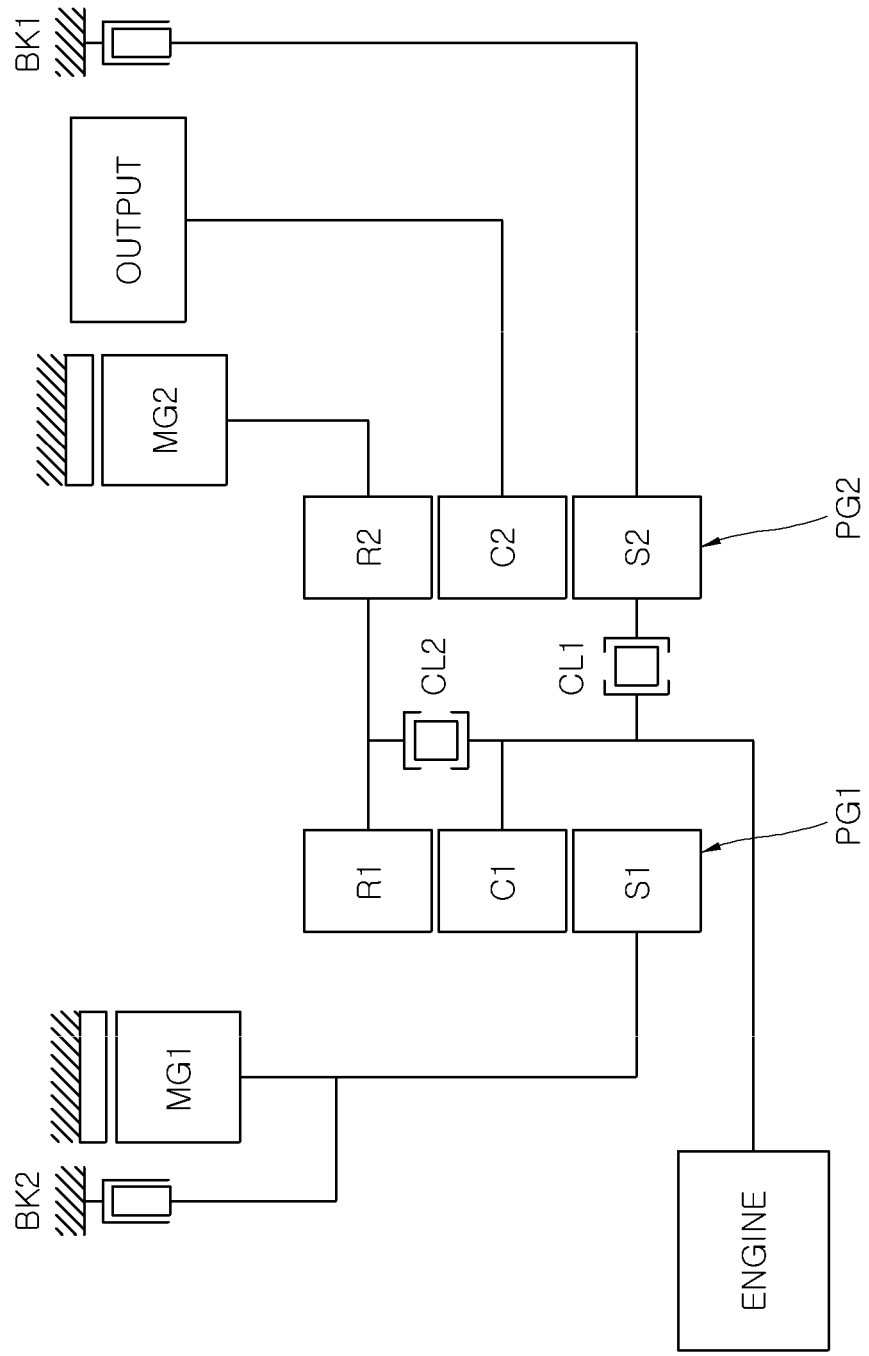
FIG. 21 is a view showing an eleventh exemplary embodiment according to an exemplary embodiment of the present invention.

In the eleventh exemplary embodiment shown in FIG. 21, first ring gear R1 of first planetary gear set PG1 is consistently connected to second ring gear R2 of second planetary gear set PG2, first motor generator MG1 is connected to first sun gear S1, second motor generator MG2 is connected to second ring gear R2, first clutch CL1 connects/disconnects first carrier C1 and second sun gear S2, second clutch CL2 connects/disconnects first carrier C1 and first ring gear R1, first brake BK1 is connected to second sun gear S2, and second brake BK2 is connected to the first sun gear S1.

The operation modes of the eleventh exemplary embodiment, as shown in the table of FIG. 22, include an EV1 mode and an EV2 mode that are electric vehicle modes, an input division mode and a composite division mode that are power division modes, and UD, 1:1, and 0D modes that are fixed gear ratio modes.

The EV1 mode is implemented by driving second motor generator MG2 such that torque of second ring gear R2 is reduced and outputted to second carrier C2, with second sun gear S2 fixed by first brake BK1 and the EV2 mode is implemented by additionally engaging first clutch CL1 such that first carrier C1 is fixed by first brake BK1 and the power from first motor generator MG1 can be further supplied to output element OUTPUT.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 22, when the gear ratio of ring gear and sun gear is 2:1.

Figure 23:
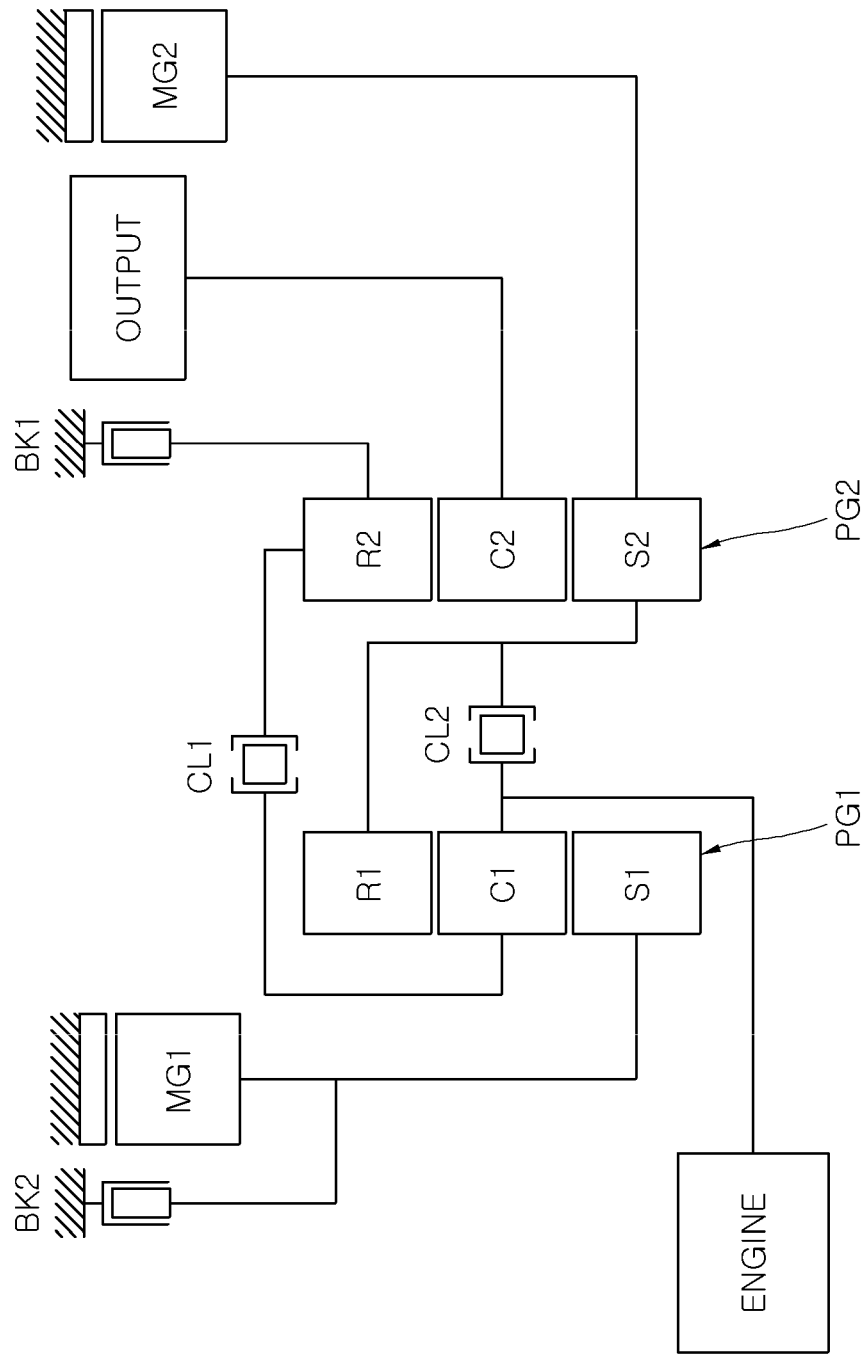
FIG. 23 is a view showing a twelfth exemplary embodiment according to an exemplary embodiment of the present invention.

In the twelfth exemplary embodiment shown in FIG. 23, first ring gear R1 of first planetary gear set PG1 is consistently connected to second sun gear S2 of second planetary gear set PG2, first motor generator MG1 is connected to first sun gear S1, second motor generator MG2 is connected to second sun gear S2, first clutch CL1 connects/disconnects first carrier C1 and second ring gear R2, second clutch CL2 connects/disconnects first carrier C1 and first ring gear R1, first brake BK1 is connected to second ring gear R2, and second brake BK2 is connected to the first sun gear S1.

The operation modes of the twelfth exemplary embodiment, as shown in the table of FIG. 24, include an EV1 mode and an EV2 mode that are electric vehicle modes, an input division mode and a composite division mode that are power division modes, and UD1, UD2, 1:1, and 0D modes that are fixed gear ratio modes.

The EV1 mode is implemented by driving second motor generator MG2 such that torque of second sun gear S2 is reduced and outputted to second carrier C2, with second ring gear R2 fixed by first brake BK1 and the EV2 mode is implemented by additionally engaging first clutch CL1 such that first carrier C1 is fixed by first brake BK1 and the power from first motor generator MG1 can be further supplied to output element OUTPUT.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 24, when the gear ratio of ring gear and sun gear is 2:1.

Figure 25:
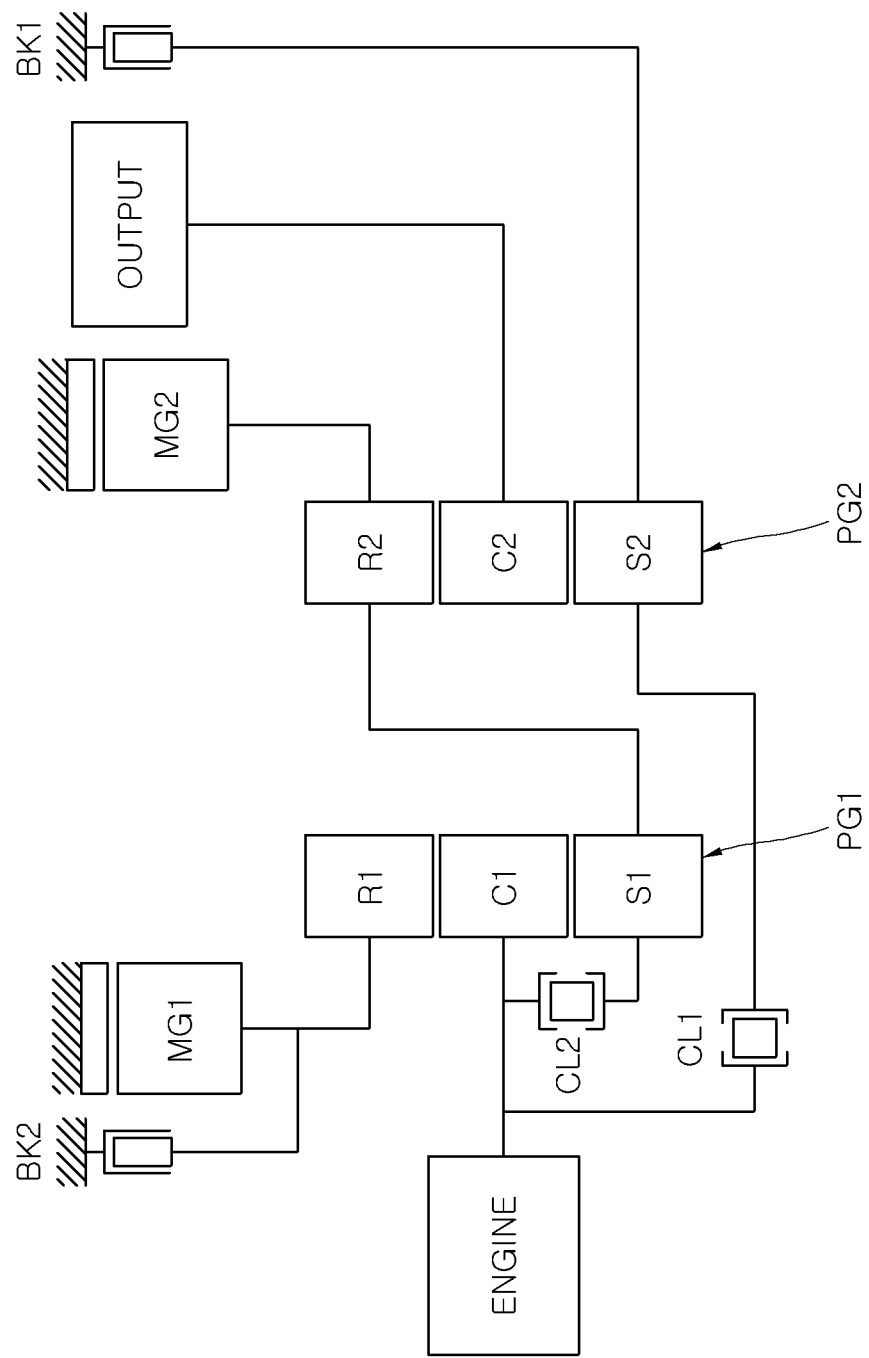
FIG. 25 is a diagram illustrating a thirteenth exemplary embodiment according to an exemplary embodiment of the present invention.

In the thirteenth exemplary embodiment shown in FIG. 25, first sun gear S1 of first planetary gear set PG1 is consistently connected to second ring gear R2 of second planetary gear set PG2, first motor generator MG1 is connected to first ring gear R1, second motor generator MG2 is connected to second ring gear R2, first clutch CL1 connects/disconnects first carrier C1 and second sun gear S2, second clutch CL2 connects/disconnects first carrier C1 and first sun gear S1, first brake BK1 is connected to second sun gear S2, and second brake BK2 is connected to the first ring gear R1.

The operation modes of the thirteenth exemplary embodiment, as shown in the table of FIG. 26, include an EV1 mode and an EV2 mode that are electric vehicle modes, an input division mode and a composite division mode that are power division modes, and UD, 1:1, 0D1, and 0D2 modes that are fixed gear ratio modes.

The EV1 mode is implemented by driving second motor generator MG2 such that torque of second ring gear R2 is reduced and outputted to second carrier C2, with second sun gear S2 fixed by first brake BK1 and the EV2 mode is implemented by additionally engaging first clutch CL1 such that first carrier C1 is fixed by first brake BK1 and the power from first motor generator MG1 can be further supplied to output element OUTPUT.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 26, when the gear ratio of ring gear and sun gear is 2:1.

Figure 27:
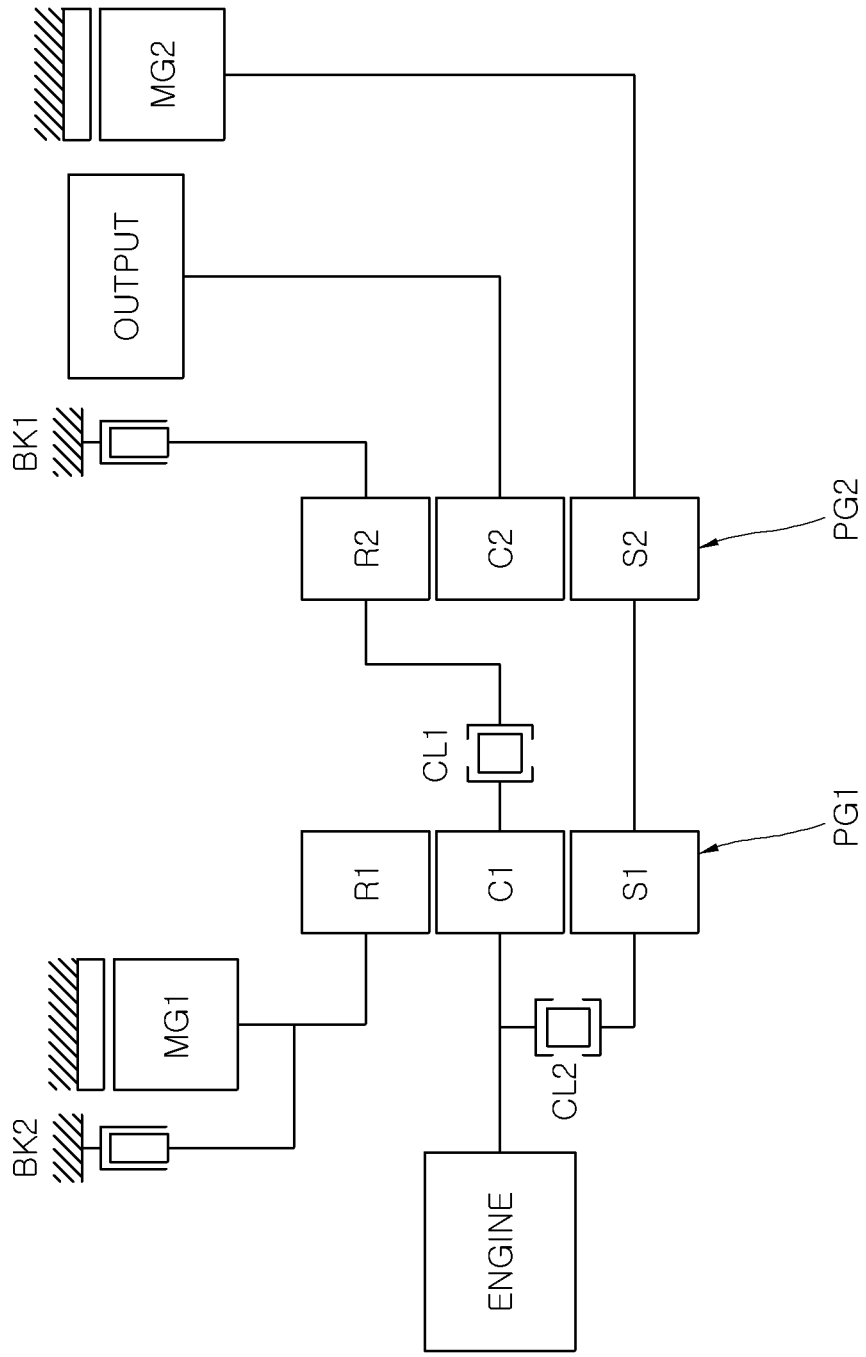
FIG. 27 is a view showing a fourteenth exemplary embodiment according to an exemplary embodiment of the present invention.

In the fourteenth exemplary embodiment shown in FIG. 27, first sun gear S1 of first planetary gear set PG1 is consistently connected to second sun gear S2 of second planetary gear set PG2, first motor generator MG1 is connected to first ring gear R1, second motor generator MG2 is connected to second sun gear S2, first clutch CL1 connects/disconnects first carrier C1 and second ring gear R2, second clutch CL2 connects/disconnects first carrier C1 and first sun gear S1, first brake BK1 is connected to second ring gear R2, and second brake BK2 is connected to the first ring gear R1.

The operation modes of the fourteenth exemplary embodiment, as shown in the table of FIG. 28, include an EV1 mode and an EV2 mode that are electric vehicle modes, an input division mode and a composite division mode that are power division modes, and UD, 1:1, and 0D modes that are fixed gear ratio modes.

The EV1 mode is implemented by driving second motor generator MG2 such that torque of second sun gear S2 is reduced and outputted to second carrier C2, with second ring gear R2 fixed by first brake BK1 and the EV2 mode is implemented by additionally engaging first clutch CL1 such that first carrier C1 is fixed by first brake BK1 and the power from first motor generator MG1 can be further supplied to output element OUTPUT.

The input division mode is implemented by engaging only first brake BK1, the composite division mode is implemented by engaging only first clutch CL1, and the fixed gear ratio mode makes the output of engine ENGINE transmitted to output element OUTPUT at various fixed gear ratios, as shown in FIG. 28, when the gear ratio of ring gear and sun gear is 2:1.

In the above, the first exemplary embodiment, second exemplary embodiments, fourth exemplary embodiment, fifth exemplary embodiment, sixth exemplary embodiment, seventh exemplary embodiment, and eighth exemplary embodiment implement three power division modes including the input division, composite division, and output division, and implement three or more fixed gear ratio modes, using two clutches and two brakes.

On the other hand, the sixth exemplary embodiment, eighth exemplary embodiment, twelfth exemplary embodiment, thirteenth exemplary embodiment, and fourteenth exemplary embodiment implement two or more power division modes including the input division and composite division, and can implement three or more fixed gear ratio modes and two EV modes including the EV2 mode that can simultaneously use first motor generator MP1 and second motor generator MG2.

In the exemplary embodiments of the present invention described above, the brakes may be implemented by a dry brake, a wet brake, a one-way brake, or a two-way brake, and the clutch may be implemented by a dry clutch, a wet clutch, or a two-way clutch.

Figure 29:
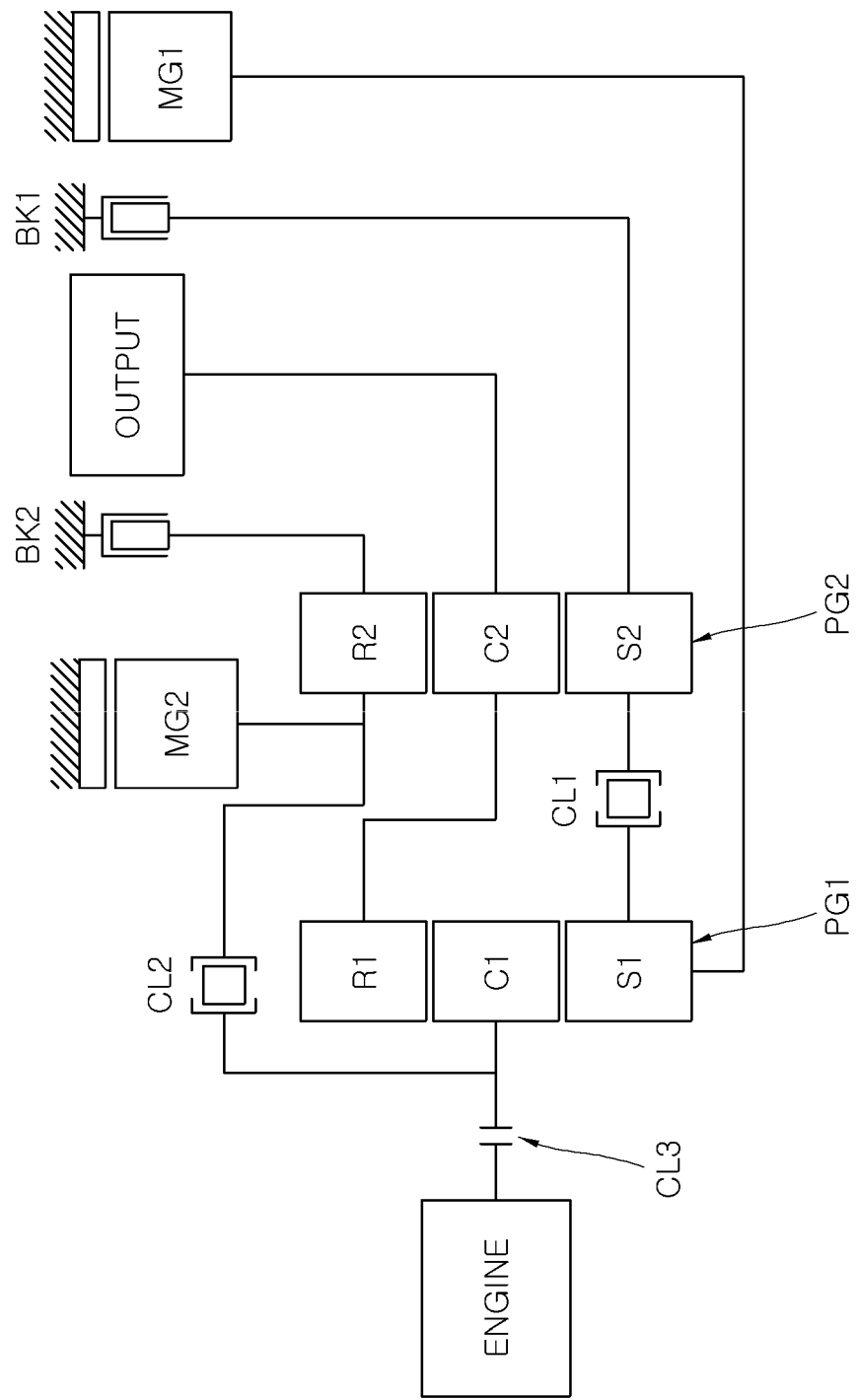
FIG. 29 is a diagram illustrating a different example of the first exemplary embodiment of a power train further including a third clutch for a hybrid vehicle according to an exemplary embodiment of the present invention.

Further, a dry or wet third clutch may be selectively mounted between the engine, which is an input element, and the other elements and a torsion damper having the function of torque limiters may be selectively mounted between the engine that is an input element and the other elements, in the exemplary embodiments described above. Therefore, as representative embodiments, a configuration implemented by adding a third clutch CL3 to the exemplary embodiment shown in FIG. 1 is shown in FIG. 29 and a configuration implemented by adding a torsion damper TD to the exemplary embodiment shown in FIG. 1 is shown in FIG. 30.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle, comprising:
two single planetary gear sets having one rotary element, respectively, in which the rotary members are consistently connected;
a first motor generator connected to a rotary element of a first planetary gear set, one of the single two planetary gear sets;
a second motor generator connected to a rotary element of a second planetary gear set, the other of the two single planetary gear sets;
an input element connected to any one of the rotary elements of the first planetary gear set;
an output element connected to any one of the rotary elements not connected with the second motor generator, in the rotary elements of the second planetary gear set; and
four torque transmission mechanisms connected to the rotary elements of the first planetary gear set and the second planetary gear set,
wherein the first planetary gear set includes a first sun gear, a first carrier, and a first ring gear, as the rotary elements,
the second planetary gear set includes a second sun gear, a second carrier, and a second ring gear, as the rotary elements,
the input element is an engine consistently connected to the first carrier,
the output element is consistently connected to the second carrier,
two of the four torque transmission mechanisms are clutches connecting/disconnecting two rotary members, the others of the clutches are brakes connecting/disconnecting rotary members to fixed members to stop rotation; and
at least one of the two brakes is connected to any one of the second sun gear and the second ring gear of the second planetary gear set, and
wherein the first ring gear of the first planetary gear set is consistently connected to the second carrier of the second planetary gear set,
the first motor generator is connected to the first sun gear,
the second motor generator is connected to the second sun gear,
the two clutches are a first clutch and a second clutch,
the first clutch connects/disconnects the first sun gear and the second ring gear,
the second clutch connects/disconnects the first carrier and the second sun gear,
the two brakes are a first brake and a second brake,
the first brake is connected to the second ring gear, and
the second brake is connected to the second sun gear.

2. A power train for a hybrid vehicle, comprising:
a first planetary gear set is a single planetary gear set;
a second planetary gear set having one rotary element consistently connected with one rotary element of the first planetary gear set;
a first motor generator connected to one rotary element of the first planetary gear set,
a second motor generator connected with one rotary element of the second planetary gear set,
an input element connected to any one of rotary elements of first planetary gear set;
an output element connected to any one of rotary elements not connected with the second motor generator, in rotary elements of the second planetary gear set;
a first clutch and a second clutch respectively connecting/disconnecting one rotary element of the first planetary gear set and one rotary element of the second planetary gear set; and
a first brake and a second brake of which at least one is connected with any one of the other rotary elements not connected with the output element of the secondary planetary gear set, wherein the first planetary gear set includes a first sun gear, a first carrier, and a first ring gear,
the second planetary gear set includes a second sun gear, a second carrier, and a second ring gear,
the input element is an engine connected to the first carrier,
the output element is connected to the second carrier, and
any one of the first clutch and the second clutch connects/disconnects the rotary element, which is connected with the input element, in the first planetary gear set, and one rotary element of the second planetary gear set, and
wherein the first ring gear of the first planetary gear set is consistently connected to the second carrier of the second planetary gear set,
the first motor generator is connected to the first sun gear,
the second motor generator is connected to the second sun gear,
the first clutch connects/disconnects the first sun gear and the second ring gear,
the second clutch connects/disconnects the first carrier and the second sun gear,
the first brake is connected to the second ring gear, and
the second brake is connected to the second sun gear.

\* \* \* \* \*